United States Patent [19]
Taura et al.

[11] Patent Number: 6,038,275
[45] Date of Patent: *Mar. 14, 2000

[54] DIGITAL BROADCASTING RECEIVER

[75] Inventors: Kenichi Taura; Tadatoshi Ohkubo; Masahiro Tsujishita; Yoshiharu Ohsuga, all of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/842,789

[22] Filed: Apr. 16, 1997

[30] Foreign Application Priority Data

May 8, 1996 [JP] Japan ............................... 8-113855 (P)

[51] Int. Cl.[7] ........................... H04L 25/36; H04L 25/40; H04L 7/00
[52] U.S. Cl. ........................... 375/371; 370/516; 375/316
[58] Field of Search ....................... 375/316, 340, 375/349, 362, 371, 355, 260; 370/503, 516, 358

[56] References Cited

U.S. PATENT DOCUMENTS

| | | |
|---|---|---|
| 5,191,576 | 3/1993 | Pommier et al. . |
| 5,359,367 | 10/1994 | Stockill ................................ 348/552 |
| 5,371,761 | 12/1994 | Daffara et al. . |
| 5,513,385 | 4/1996 | Tanaka ................................ 455/228 |
| 5,550,812 | 8/1996 | Philips ................................ 370/19 |
| 5,550,914 | 8/1996 | Clarke et al. ........................ 379/230 |

FOREIGN PATENT DOCUMENTS

| | | |
|---|---|---|
| 0653858 | 5/1995 | European Pat. Off. . |
| 0656706 | 6/1995 | European Pat. Off. . |
| 2266645 | 11/1993 | United Kingdom . |
| 2278257 | 11/1994 | United Kingdom . |
| 9519671 | 7/1995 | WIPO . |

*Primary Examiner*—Chi H. Pham
*Assistant Examiner*—Jean B Corrielus

[57] ABSTRACT

A digital broadcasting receiver reduces the amount of operations in timing synchronization processing while reducing circuit scale and power consumption. Selective data extraction thins out and band-limits input data from demodulation data of phase reference symbols subjected to known modulation as synchronizing signal to reduce the number of data, so that the amount of required operations in phase correcting, IDFT and peak detecting can be reduced.

20 Claims, 16 Drawing Sheets

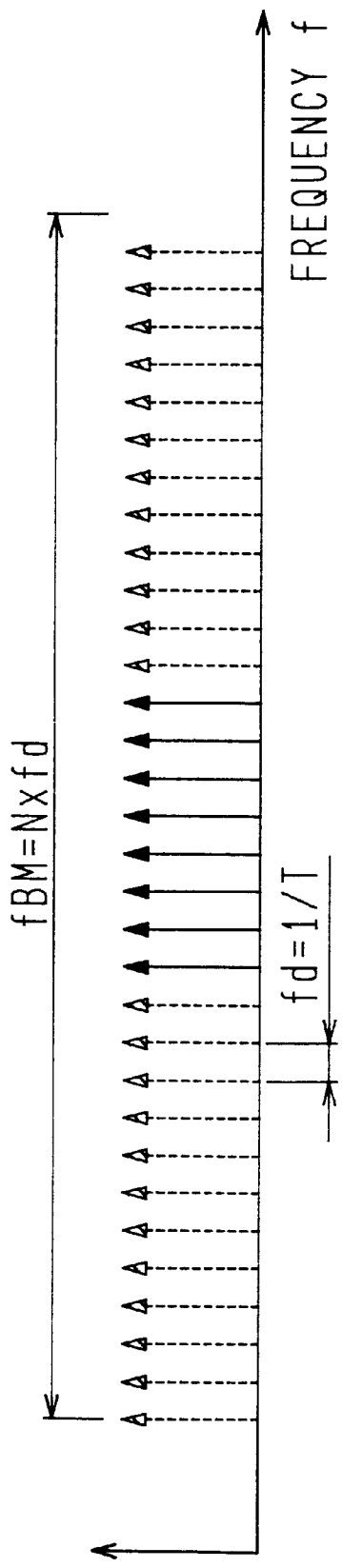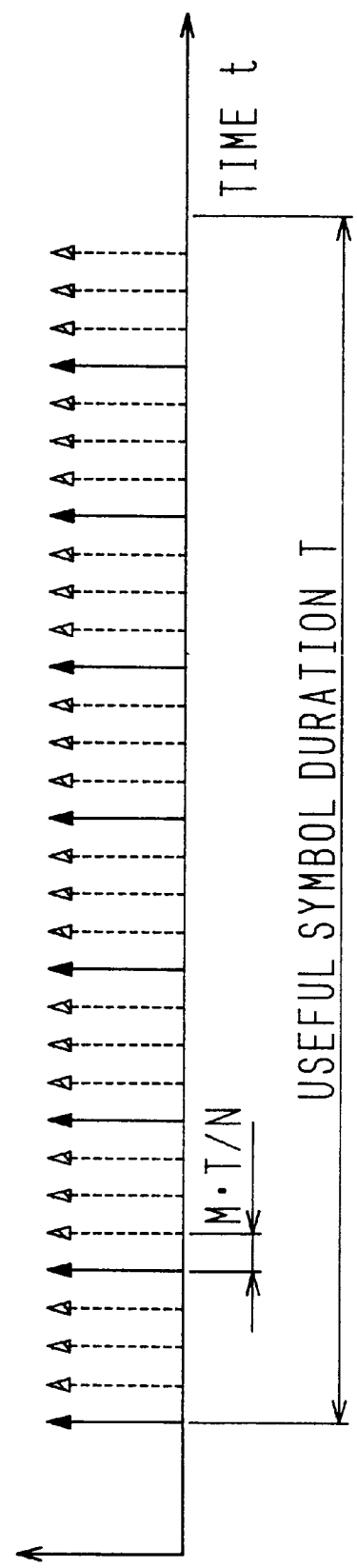

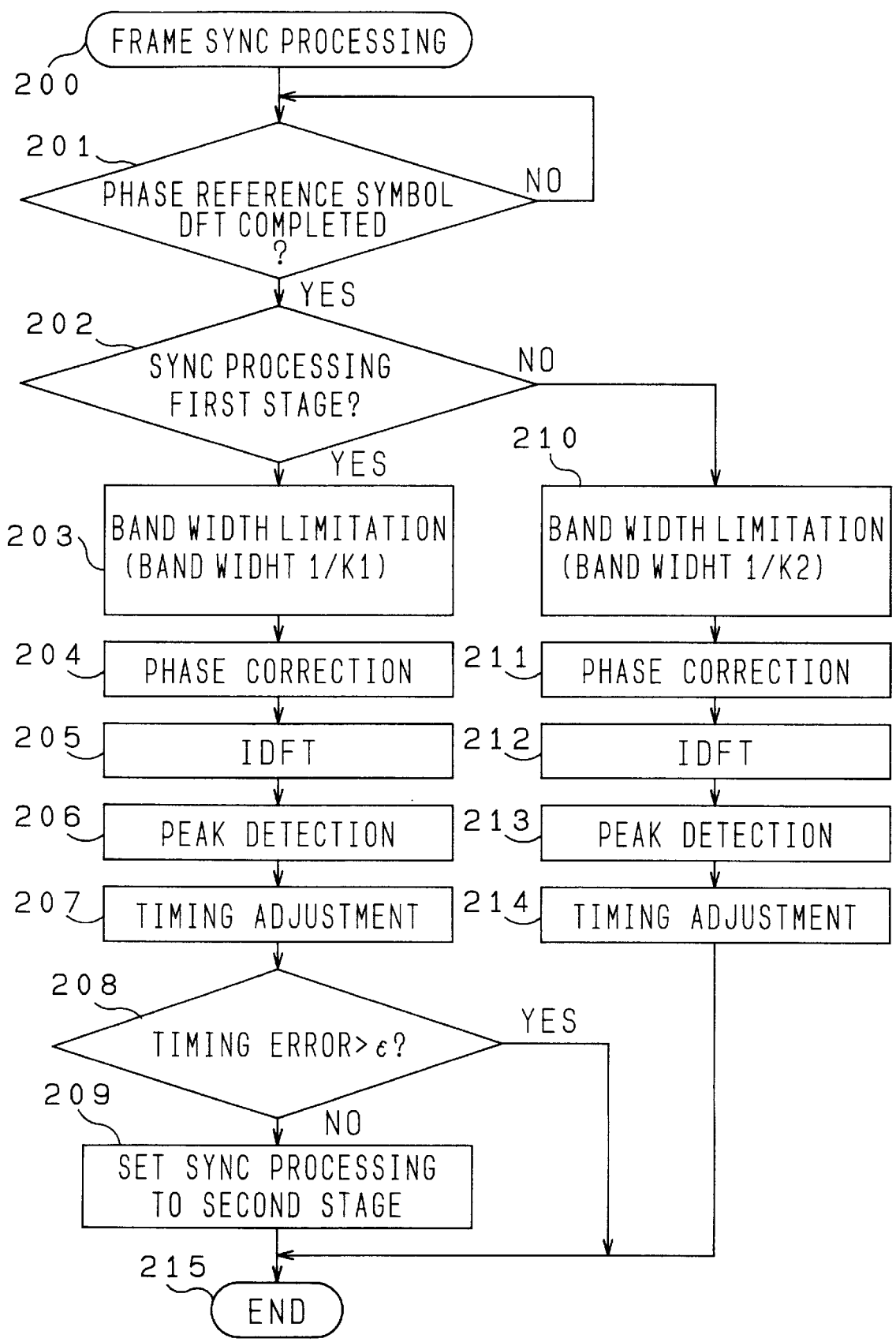

DIGITAL BROADCASTING RECEIVER

BACKGROUND OF THE INVENTION

1. Field of the Invention

The present invention relates to receivers for digital broadcasting which uses multi-carrier transmission methods such as OFDM (Orthogonal Frequency Division Multiplexing), FDM (Frequency Division Multiplexing), etc., and particularly to a synchronization control device for data frame structure and individual transmitted symbols.

2. Description of the Background Art

The OFDM (Orthogonal Frequency Division Multiplex) transmission system is known as a method for enabling transmission of digital data to mobile objects largely affected by problems in radio propagation such as multipath and fading, whose utilization for broadcasting is being developed. Typically, it includes the digital Audio Broadcasting (hereinafter referred to as DAB) provided by ITU-R recommendation BS.774.

FIG. 14 is a block diagram of a conventional digital broadcasting receiver. In this diagram, 1 denotes an antenna, 2 denotes an RF amplifier, 3 denotes a frequency converter, 4 denotes a local oscillator, 5 denotes an intermediate frequency filter, 6 denotes an intermediate frequency amplifier, 7 denotes a quadrature demodulator, 8 denotes an intermediate frequency oscillator, 9 denotes an A/D converter, 10 denotes a alignment signal detector, 11 denotes a data demodulator, 12 denotes a control device, 13 denotes an error correcting code decoder, 14 denotes an MPEG (Moving Picture Experts Group) audio decoder, 15 denotes a D/A converter, 16 denotes an audio amplifier, and 17 denotes a speaker.

In the receiver constructed as explained above, broadcasting wave received at the antenna 1 is subjected to amplification in the RF amplifier 2, frequency conversion in the frequency converter 3, removal of unnecessary components such as adjacent channel waves in the intermediate frequency filter 5, amplification in the intermediate frequency amplifier 6, detection in the quadrature demodulator 7 and then applied to the A/D converter 9 as baseband signal.

The signal sampled by the A/D converter 9 is demodulated in the data demodulator 11. Specifically, the processings performed there include phase detection of each transmission carrier subjected to Quadrature Phase Shift Keying (QPSK) by complex discrete Fourier transform processing (hereinafter referred to as DFT processing) for each transmission symbol and differential demodulation based on the co-carrier modulation comparison between two transmission symbols adjacent in time. The OFDM demodulated data is sequentially outputted to the error correcting code decoder 13 according to the carrier order rule for modulation on the transmitting end.

The error correcting code decoder 13 releases time interleaving over a plurality of transmission symbols made on the transmitting end and decodes the data transmitted in the form of convolutional codes. At this time, errors in the data, which took place in the transmission path, are corrected.

In the decoded data in the error correcting code decoder 13, audio data is outputted to the MPEG audio decoder 14 and control data indicating contents and structure of the transmission data is outputted to the control device 12. The MPEG audio decoder 14 expands DAB audio data compressed according to the rule of ISO/MPEG1 layer 2 and provides the data to the D/A converter 15. The audio signal, analogue-converted in the D/A converter 15, is reproduced from the speaker 17 through the audio amplifier 16.

The alignment signal detector 10 detects a null symbol (=a period without signal) in the frame alignment signal in the DAB transmission signal shown in FIG. 16 by envelope detection, whose output is applied to the control device 12. The control device 12 estimates timing of following transmission symbols on the basis of the null symbol timing to provide control so that the data demodulator 11 can correctly apply DFT processing to each symbol.

While rough synchronization is thus established with the demodulation signal, the synchronization processing is based on the envelope detection of the null symbol provided at the head of a frame and hence it is difficult to obtain correct timing in the case where reflected wave or noise overlaps the signal. Accordingly, more correct synchronization processing is performed on the basis of the phase reference symbol which is provided as part of the alignment signal and in which modulation of each carrier is known.

FIG. 15 is a block diagram of a timing synchronization processing device in a conventional digital broadcasting receiver. The timing synchronization processing device is included in the control device 12 of FIG. 14. In this diagram, 101 denotes phase correcting means, 102 denotes phase reference symbol data holding means, 103 denotes IDFT (inverse discrete Fourier transform) means and 104 denotes peak detecting means.

In this synchronization processing, the input of the phase correcting means 101, provided from the OFDM demodulator 11 in FIG. 14, is the result of DFT processing of demodulation signal of the phase reference symbol, which can be expressed as shown below (data corresponding to an mth carrier). The expression (1) represents demodulation data of the mth carrier provided as the result of the DFT processing. The DFT processing is a complex FFT, whose result is complex number data having a real part and an imaginary part. The expression (1) represents the complex number data in terms of amplitude and phase. Note that effect of noise is deleted here.

$$A_m \cdot e^{j\frac{2\pi \cdot m}{T} t_e} \cdot e^{j\theta_m} \quad (1)$$

Where, $\theta_m$ represents modulation phase, $t_e$ represents a timing shift or timing error of the sampling starting timing in the data demodulator 11 from the effective symbol starting timing, and $A_m$ represents amplitude of demodulation data of the mth carrier. In the case of DAB, since carriers are modulated by QPSK, the amplitude $A_m$ is approximately constant irrespective of the numbers of the carriers.

The phase correcting means 101 multiplies the input data, by using known phase reference symbol data provided from the phase reference symbol data holding means 102, by its complex conjugate value. In the ideal condition, this releases phase modulation applied to each carrier of the phase reference symbol and all carriers thus match in phase in the output of the phase correcting means 101. The complex conjugate value of the phase reference symbol modulation data can be represented by the minus $j\theta_m$th power of the natural logarithm e. The term including $\theta_m$ in the expression (1) is thus eliminated in the output of the phase correcting means 101.

Next, in the IDFT means 103, inverse discrete Fourier transform processing (hereinafter referred to as IDFT processing) is applied to the output of the phase correcting means 101. Then, in the output transformed into the time region, an impulse signal is generated at the point where all carrier phases coincide, i.e., at $t=t_e$.

The peak detecting means 104 detects the impulse signal appearing in the output of the IDFT means 103 on the basis of amplitude of each data. The position of the impulse signal detected there approximately corresponds to the time gap of $t_e$, which represents a time gap between the sampling starting timing in the data demodulator 11 and the starting timing of the phase reference symbol. Therefore, adjusting timing so that the position of the impulse signal is at the head of the IDFT processing result enables correct timing synchronization processing.

In the timing synchronization processing device explained above, a large amount of operations are required in the above-described processings when a large number of carriers are used for transmission (1,536 carriers are used in the DAB transmission mode 1 and 2,048 point processing is done in IDFT), which results in large circuit scale. Or, the necessity of high-speed operation increases power dissipation.

SUMMARY OF THE INVENTION

An aspect of the present invention relates to a digital broadcasting receiver for multi-carrier transmission system, which includes: a data demodulator for performing demodulation of modulation data from a received signal; selective data extraction means for extracting data from an arrangement of demodulation data of phase reference symbols of each carrier provided as output of the data demodulator; phase correcting means for performing multiplication, for each element, of the extracted data by the selective data extraction means and an arrangement of conjugate complex numbers of defined values of the phase reference symbols held in the receiver in advance in correspondence with the extracted data; inverse discrete Fourier transform means for applying inverse discrete Fourier transform to the product on the phase correcting means; peak detecting means for obtaining a peak of the result of the inverse discrete Fourier transform in the inverse discrete Fourier transform means; and synchronization control means for adjusting timing of the received signal provided to the data demodulator on the basis of the position of the peak detected by the peak detecting means.

Preferably, according to another aspect of the present invention, in the digital broadcasting receiver, the selective data extraction means extracts data in a skipped manner at approximately equal prescribed frequency intervals of those in the arrangement of the phase reference symbol demodulation data at the beginning of the synchronization processing, and in the next stage of the synchronization processing, extracts the data in a skipped manner at rougher intervals than at the beginning of the synchronization processing.

Preferably, according to still another aspect of the present invention, in the digital broadcasting receiver, the selective data extraction means extracts data in a prescribed frequency range in the center part of the signal transmission band and at approximately equal prescribed intervals in the arrangement of the phase reference symbol demodulation data at the beginning of the synchronization processing, and extracts the data, in the next stage of the synchronization processing, in a wider frequency range than at the beginning of the synchronization processing and at rougher frequency intervals than at the beginning of the synchronization processing.

The present invention constructed as stated above has the following effects.

Processing a required minimum amount of data for timing synchronization processing extracted from demodulation data allows the amount of required operation to be reduced, which reduces circuit scale and power consumption of the receiver.

Performing the timing synchronization processing based on processing of phase reference symbol data in two stages with appropriate extracting processing in each stage allows further reduction of the amount of processed data in the second stage of processing as a stationary stage, which further reduces the power consumption of the receiver.

Performing the timing synchronization processing based on the processing of the phase reference symbol data in two stages with extracting processing and band limiting processing allows further reduction of the amount of processed data in each stage, which further reduces the power consumption of the receiver.

The present invention has been made to solve the problems described above, and an object of the invention is to provide a digital broadcasting receiver which can reduce the amount of data processing required in timing synchronization processing for demodulation of received signal of the digital broadcasting receiver to reduce the circuit scale and the power consumption and can also reduce the number of phase reference symbol demodulation data used in the synchronization processing to a necessary minimum by extraction and bandwidth limitation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4A and 4B are diagrams illustrating operation of the timing synchronization processing device of the first preferred embodiment of the present invention;

FIG. 7 is a flow chart of a timing synchronization processing according to another fashion of the second preferred embodiment of the present invention;

DESCRIPTION OF THE PREFERRED EMBODIMENTS

According to digital broadcasting receivers of preferred embodiments of the present invention, selective extraction means extracts necessary minimum data for processing from demodulation data to effectively reduce the amount of required operation.

When thinning out and extracting data at approximately equal frequency intervals, data are extracted at relatively close intervals at the beginning of the synchronization processing to enable detection of timing shift in a relatively large range. In the next stage after the timing shift is corrected on the basis of the result of the detection, the data are extracted at relatively rough intervals and processed to narrow down the detecting range of the timing shift so as to further reduce the amount of operation.

At the beginning of the synchronization processing, data are extracted at relatively close intervals from carriers in a relatively small frequency range in the center part of the signal transmission band to decrease time resolution for the timing shift to further reduce the amount of operation while enabling detection of timing shift in a relatively large range. In the next stage after the timing shift has been corrected on the basis of the result of the detection, data are extracted at relatively rough intervals from carriers in a relatively large frequency range and processed to increase the time resolution while narrowing down the range of detecting timing shift to prevent an increase of the amount of operation.

The present invention is now be specifically explained on the basis of the drawings showing the preferred embodiments.

First Preferred Embodiment

Figure 1:
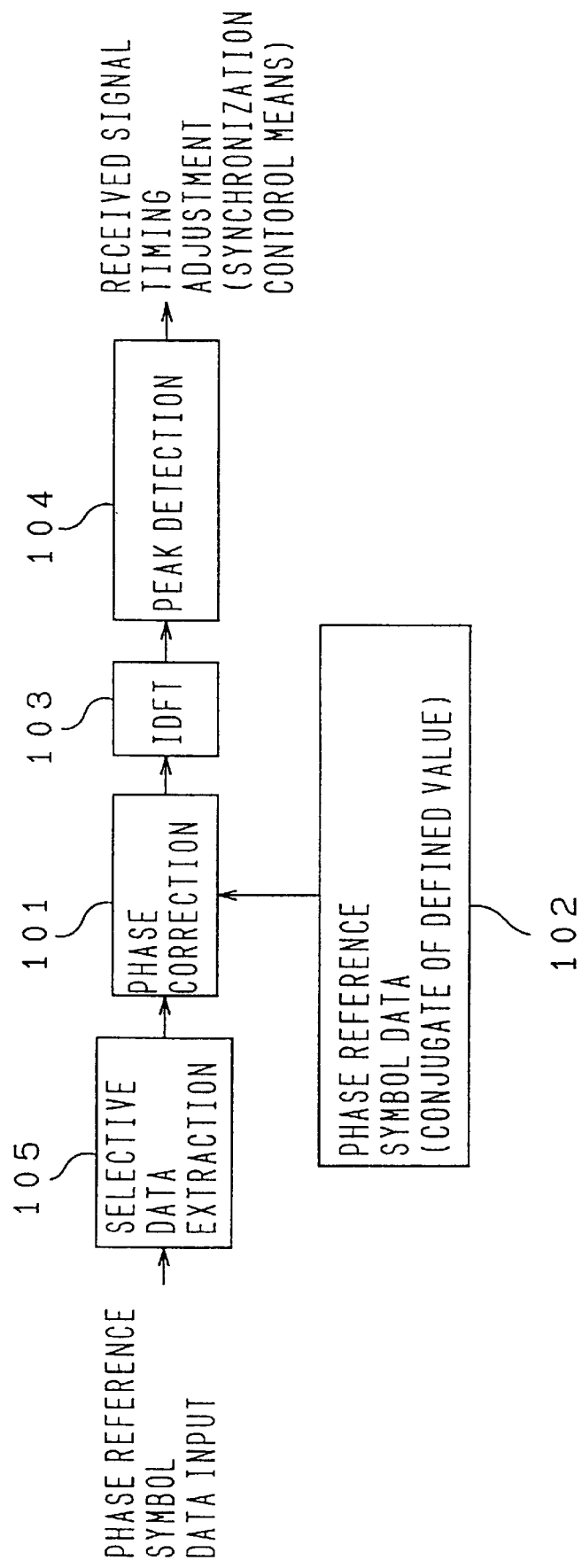
FIG. 1 is a block diagram of a timing synchronization processing device according to a first preferred embodiment of the present invention.

FIG. 1 is a block diagram of a timing synchronization processing device according to a first preferred embodiment of the present invention. In this diagram, 101 denotes phase correcting means, 102 denotes phase reference symbol data holding means, 103 denotes IDFT means, 104 denotes peak detecting means, and 105 denotes selective data extraction means. The parts shown at 101, 103 and 104 are equivalent to those of the background art, which are for generating the impulse signal at the phase reference symbol start timing. The selective data extraction means 105 appropriately extracts data actually processed in the phase correcting means 101 from the input data from the data demodulator 11 to reduce the number of processed data. The phase reference symbol data holding means 102 holds known phase reference symbol data corresponding to the received data to be processed in the phase correcting means 101.

Figure 3A:
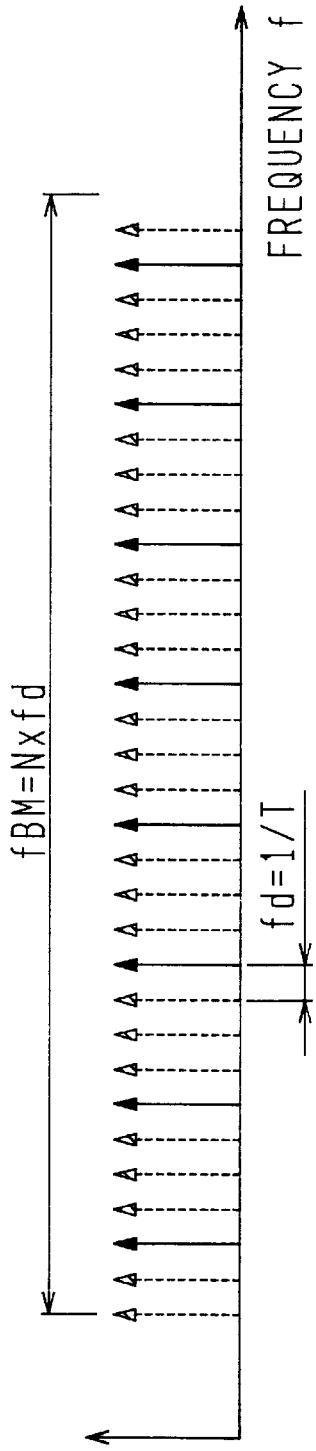
FIGS. 3A and 3B are diagrams illustrating operation of the timing synchronization processing device of the first preferred embodiment of the present invention.
Figure 3B:
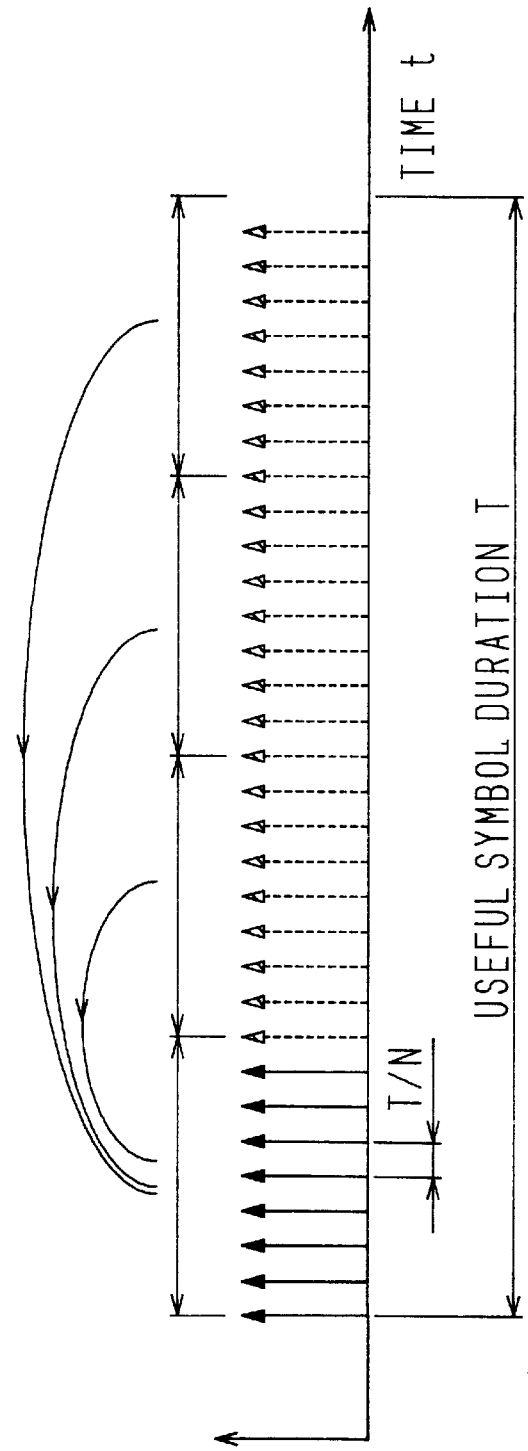

Now, the two methods used as means for reducing the number of data will be described. In the first method, data are extracted at approximately equal intervals as frequency from the demodulation data corresponding to each carrier provided from the data demodulator 11 (hereinafter referred to as an equal interval thinning-out processing). FIG. 3A and FIG. 3B are diagrams for describing the timing synchronization processing according to the first preferred embodiment. In FIG. 3A, the solid lines show data selectively extracted in the selective data extraction means 105 out of the data in the frequency region corresponding to each carrier provided from the data demodulator 11 and the broken lines show those not used in the processing. FIG. 3B shows output data provided when the phase correction and the IDFT processing are performed after reducing the number of processed data. The number of data processed in the phase correcting means 101 and the IDFT means 103 is thinned to 1/M of the number of original data and therefore the number of the output data is also 1/M. FIG. 3B shows these data by the solid lines. As shown in the diagrams, the interval is equal to the sampling cycle T/N in the data demodulator 11. The N corresponds to the number of data DFT processed in the data demodulator 11.

At this time, the data in the region shown by the broken lines in FIG. 3B are outputted overlapping with the data in the region shown by the solid lines and therefore the detecting range of the impulse signal is 1/M with respect to the useful symbol duration T. The phase component of the demodulation data with the sampling start timing shift $t_e$ is $\exp(j2\pi m t_e/T)$ as shown in the expression (1). The m in the expression (1) represents the carrier number. The process of obtaining the timing gap $t_e$ by the inverse FFT processing can be considered to be a process of returning the shift of phase of each carrier caused by the $t_e$ to time information. The phase change between extracted data is given by the expression (2) below:

$$dp=\exp(j2\pi(n-m)t_e/T)=\exp(j2\pi k t_e/T) \quad (2)$$

(Where k represents the interval of thinning-out represented in terms of the number of carriers and m, n are carrier numbers of adjacent data after the thinning-out processing).

When data are not thinned out (k=1), even if $t_e$ changes in the range of T, the resultant phase change falls in the range of $2\pi$ and hence the peak of signal resulting from the phase correction and the inverse FFT is considered to appear somewhere in the range of the useful symbol duration T shown in FIG. 3B.

When data are thinned out with k=4, a change of $t_e$ from 0 to T/4 causes the phase to change from 0 to $2\pi$. A change of $t_e$ from T/4 to T/2 corresponds to a change from $2\pi$ to $4\pi$. When represented as a complex number dp actually processed in the inverse FFT, it can not be distinguished from a change from 0 to $2\pi$. The same applies to changes of $t_e$ in the range of T/2 to 3T/4 and 3T/4 to T. FIG. 3B shows that when the original signal originally has $t_e$ in the range of T/4 to T shown by the broken-line arrows, it overlaps with the range of 0 to T/4 shown by the solid-line arrows, or can not be distinguished from it. However, since the synchronization processing based on the envelope of the null symbol prior to this synchronization processing causes the impulse signal to fall in a certain range, it is sufficient if T/M is larger than this range. This largely reduces the number of processed data.

The second method is to extract data in an appropriate range including the center frequency from the demodulation data corresponding to each carrier provided from the data demodulator 11 (hereinafter referred to as bandwidth limitation processing). FIG. 4A and FIG. 4B provide diagrams for describing the timing synchronization processing according to the first preferred embodiment, where FIG. 4A shows those selectively extracted in the selective data extraction means 105 with solid lines and those not used in the processing with broken lines. FIG. 4B shows data outputted when the processes of phase correction and IDFT are performed after the number of processed data is reduced. In this case, as shown in the diagram, the range of the output data is equal to the useful symbol duration T and the intervals of the output data are M·T/N (where M represents the data reduction ratio by the bandwidth limitation).

As the result, although the accuracy of detecting timing shift is decreased to approximately 1/M, the number of processed data can be reduced by this method in systems having the guard intervals for eliminating inter-symbol interference such as DAB which allow the detection accuracy to be decreased.

Furthermore, as a combination of the first and the second method, the number of processed data can be reduced by limiting the detecting range and the detecting accuracy of timing shift by limiting the data in an adequate range including the center frequency and extracting the data at almost equal intervals as frequency from the demodulation data corresponding to each carrier provided from the data demodulator 11.

Second Preferred Embodiment

Figure 2:
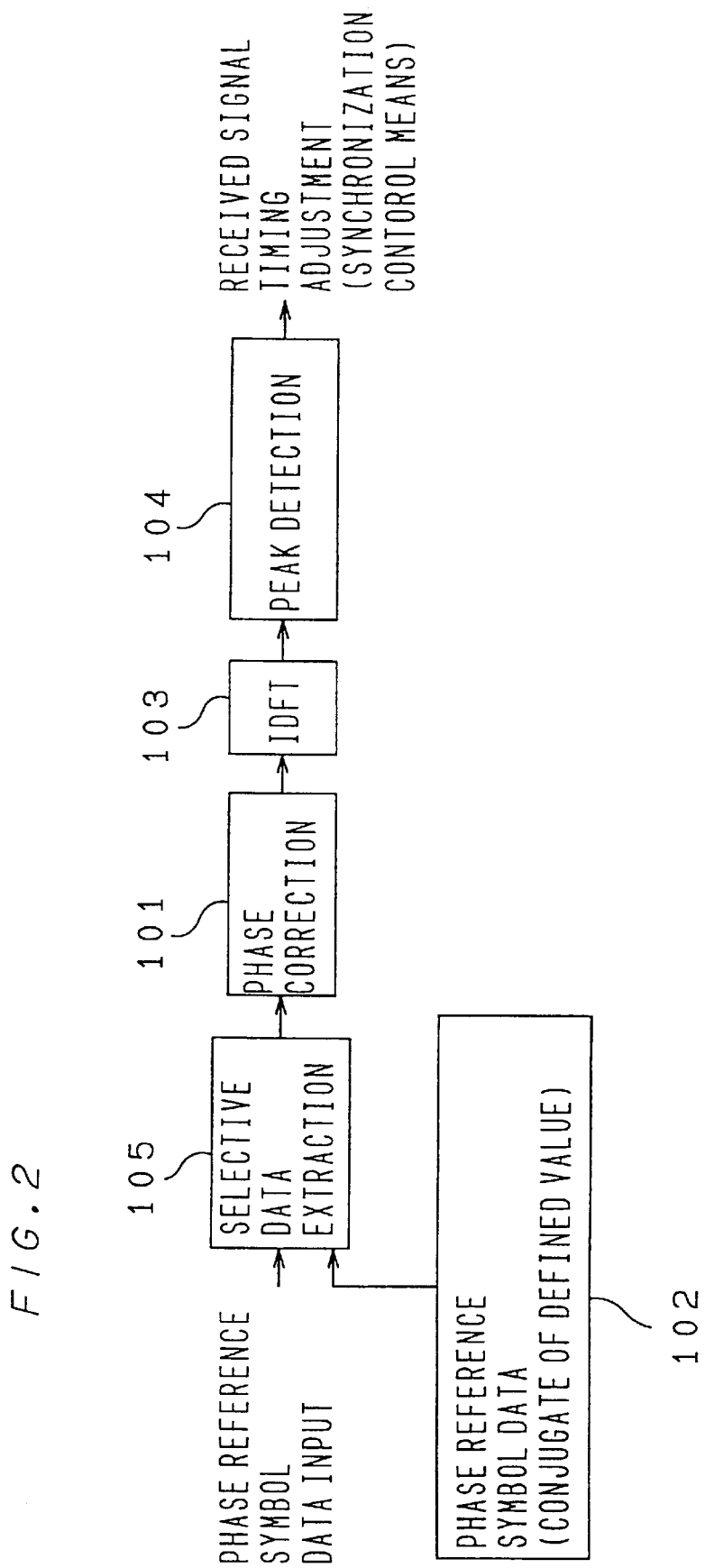
FIG. 2 is a block diagram of a timing synchronization processing device of second and third preferred embodiments of the present invention.

FIG. 2 is a block diagram of a timing synchronization processing device according to a second preferred embodiment of the present invention. In this diagram, 105 denotes selective data extraction means, 101 denotes phase correcting means, 102 denotes phase reference symbol data holding means, 103 denotes IDFT means, and 104 denotes peak detecting means. Those designated at 101, 103, and 104 are equivalent to the conventional ones. The selective data extraction means 105 appropriately extracts data to be actually processed in the phase correcting means 101 from the input from the data demodulator 11 and data in the phase reference symbol data holding means 102 to reduce the number of processed data. That is to say, the selective data extraction means 105 extracts data to be actually processed in the phase correcting means from the input data from the data demodulator 11 and also extracts phase reference symbol data corresponding to the extracted input data from the phase reference symbol data holding means 102 and outputs the data as a pair to the phase correcting means 101.

Figure 5:
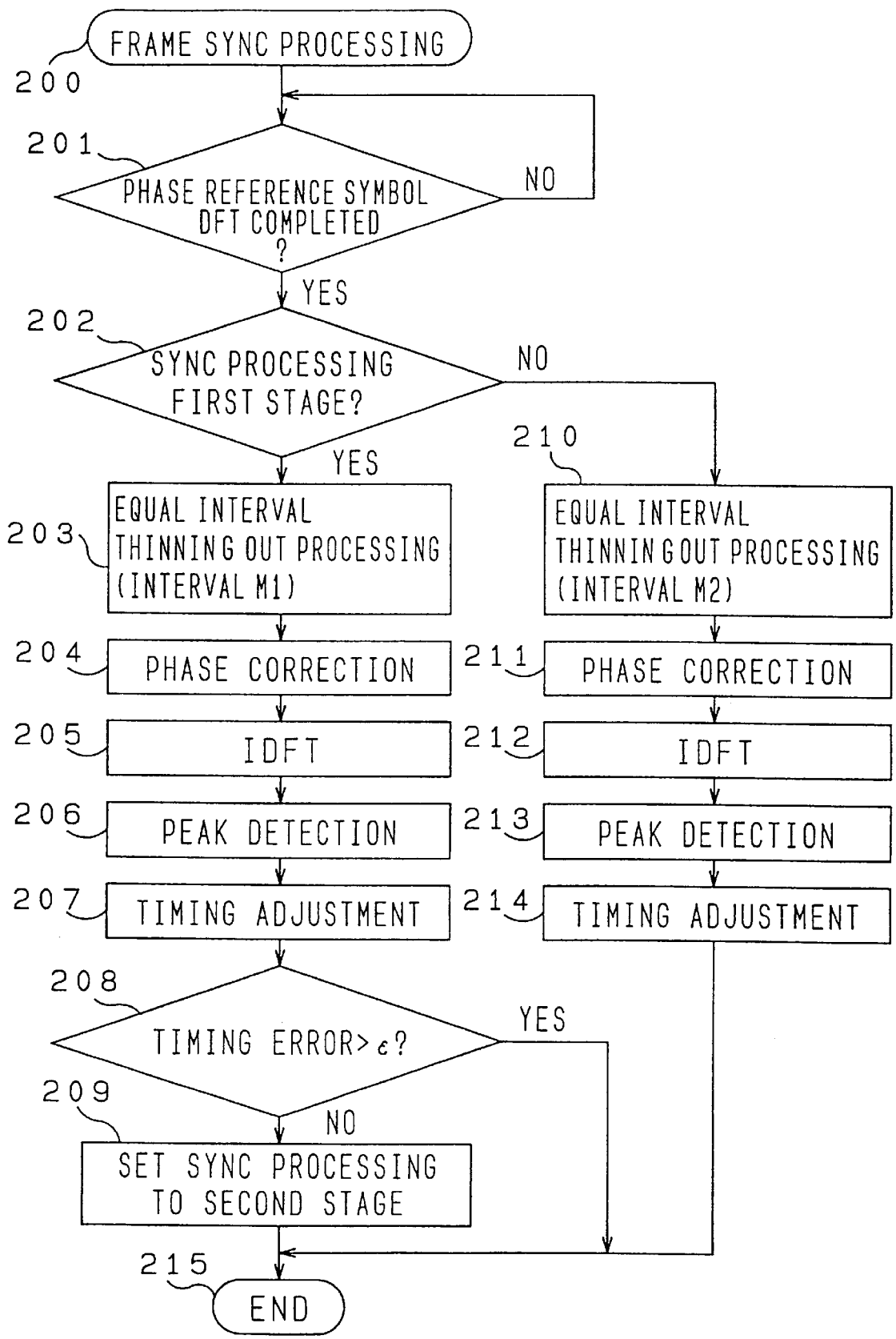
FIG. 5 is a flow chart of a timing synchronization processing in the second preferred embodiment of the present invention.

FIG. 5 is a flow chart of the timing synchronization processing in the second preferred embodiment of the invention. In the diagram, 201 denotes determination of completion of the DFT processing of the phase reference symbol, 202 denotes determination of the current stage of the synchronization processing, 203 to 207 denote the timing synchronization processing in the first stage and 210 to 214 denote the timing synchronization processing in the second stage. The numeral 208 denotes determination of magnitude of the timing shift and 209 denotes stage changing processing of the timing synchronization processing.

It is assumed that the rough timing synchronization processing based on the envelope detection of the null symbol has been completed at the start 200 of the synchronization processing based on the processing of the phase reference symbol data. Next, when the completion of the DFT processing of the phase reference symbol is determined in 201, the current synchronization processing stage is determined in 202. As the result, in the case of the first stage, data are extracted at relatively close intervals M1 in the thinning-out process 203 and then the timing synchronization processes in 204 to 207 are performed. When the result of the processing is checked in 208 to reveal that the timing shift is already small enough, it moves to the next stage of the synchronization processing (the second stage); otherwise the processing is continued in that stage.

Next, in the synchronization processes 210 to 214 in the second stage in which the timing shift has been already made small enough, the data are extracted to such a degree that the timing shift left in the first stage of synchronization processes 203 to 207 can be sufficiently detected (the intervals M2). This way, dividing the timing synchronization processing based on processing of the phase reference symbol data into two stages allows further reduction of the amount of processed data in the second stage of processing as a stationary stage.

Figure 6A:
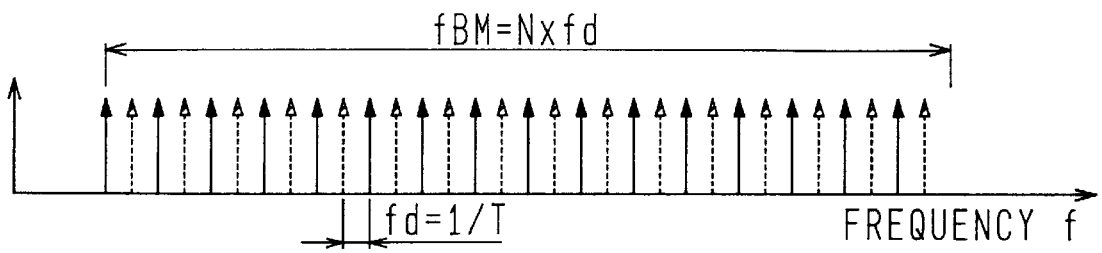
FIGS. 6A, 6B, 6C, and 6D are diagrams for illustrating the operation of the timing synchronization processing device of the second preferred embodiment of the present invention.
Figure 6B:
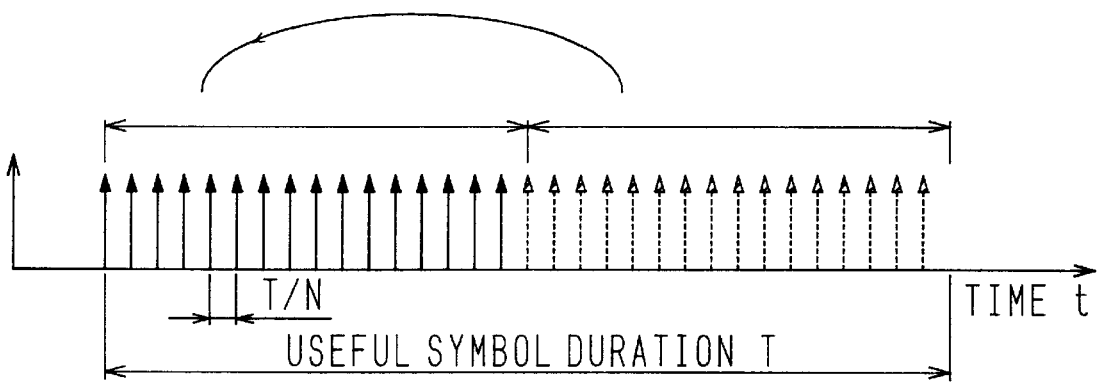
Figure 6C:
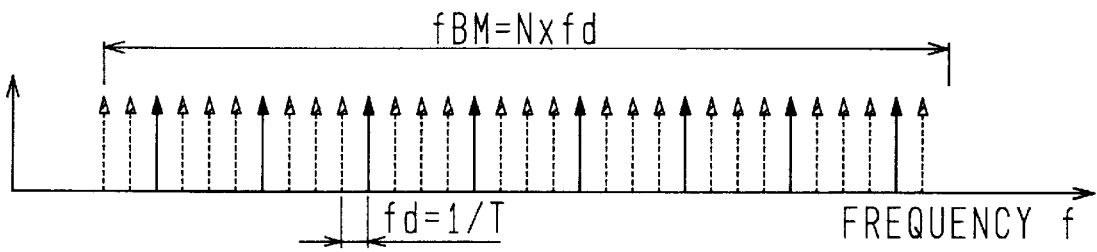
Figure 6D:
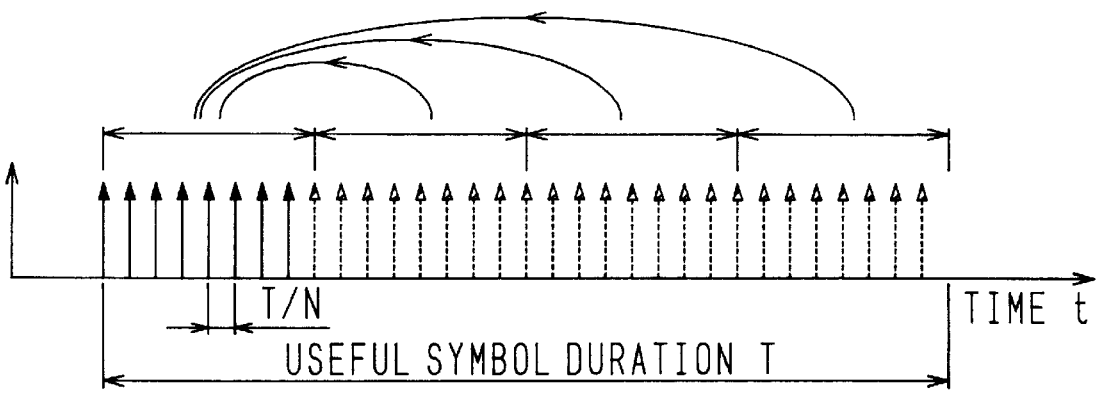
Figure 8A:
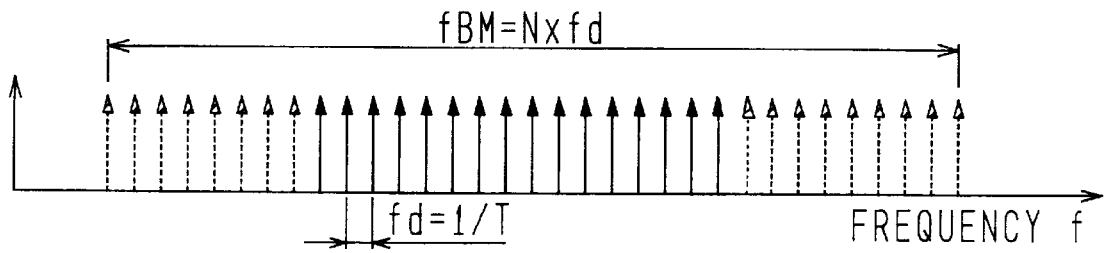
FIGS. 8A, 8B, 8C, and 8D are diagrams illustrating the operation of the timing synchronization processing device according to the fashion of the second preferred embodiment of the present invention.
Figure 8B:
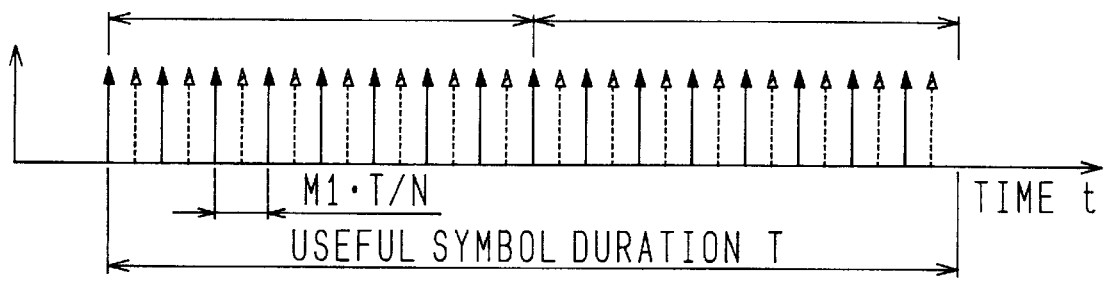
Figure 8C:
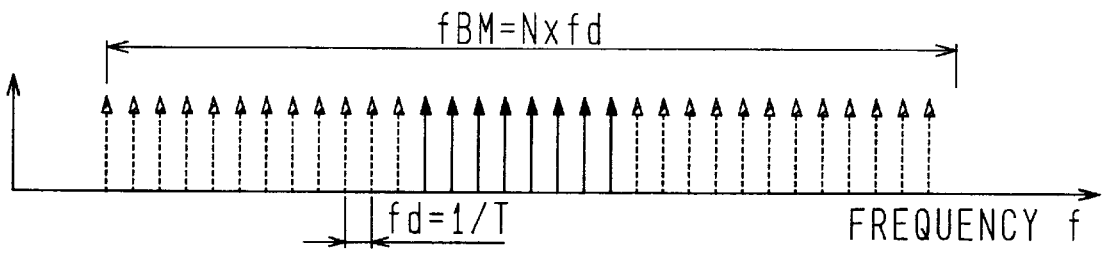
Figure 8D:
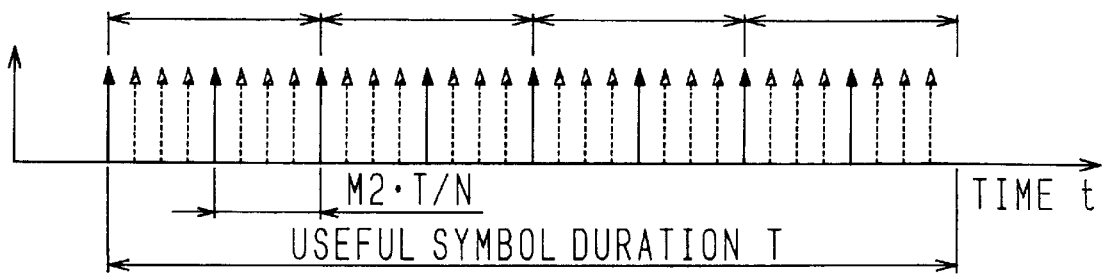

FIG. 6A to FIG. 6D are diagrams for describing the timing synchronization processing according to the second preferred embodiment, where FIG. 6A and FIG. 6B show an example of the first stage of processing and FIG. 6C and FIG. 6D shows an example of the second stage of processing.

Figure 14:
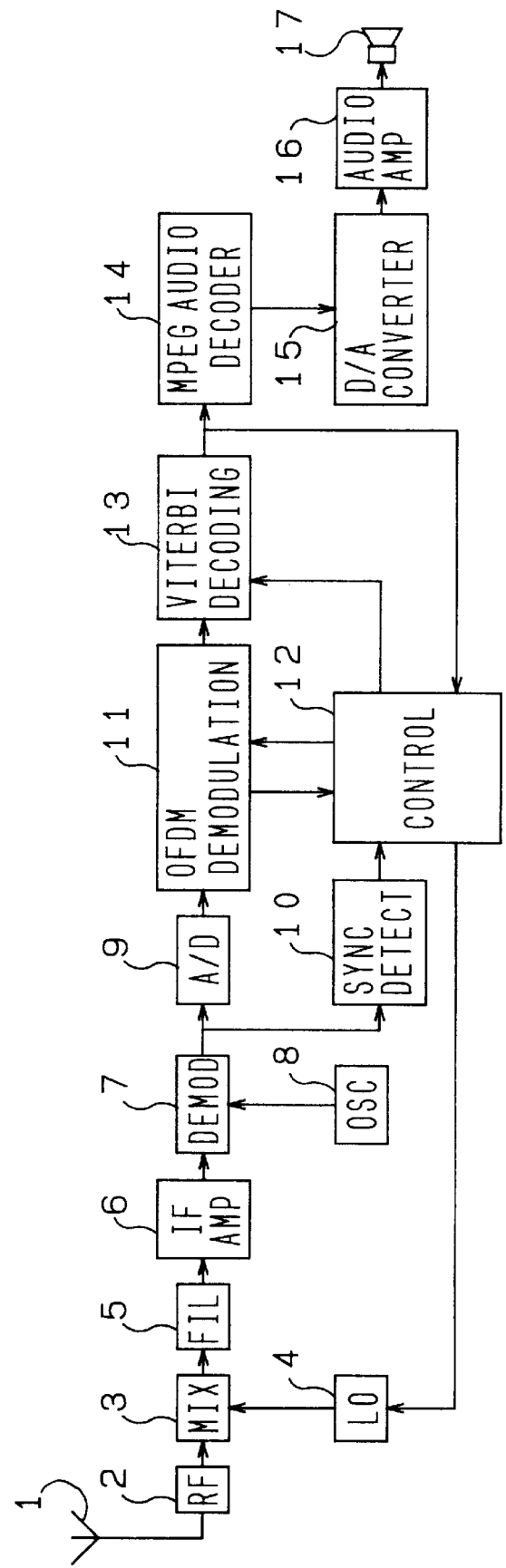
FIG. 14 is a block diagram of a conventional digital broadcasting receiver.
Figure 15:
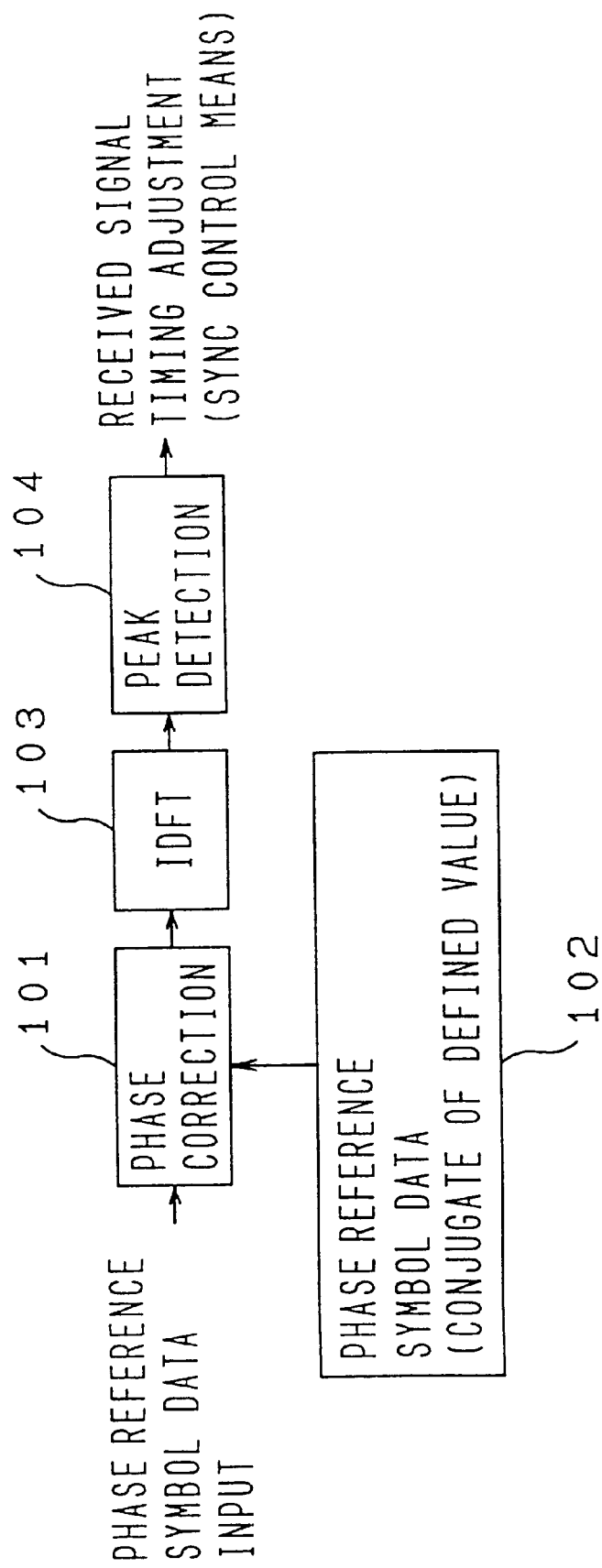
FIG. 15 is a block diagram of a timing synchronization processing device in the conventional digital broadcasting receiver.
Figure 16:
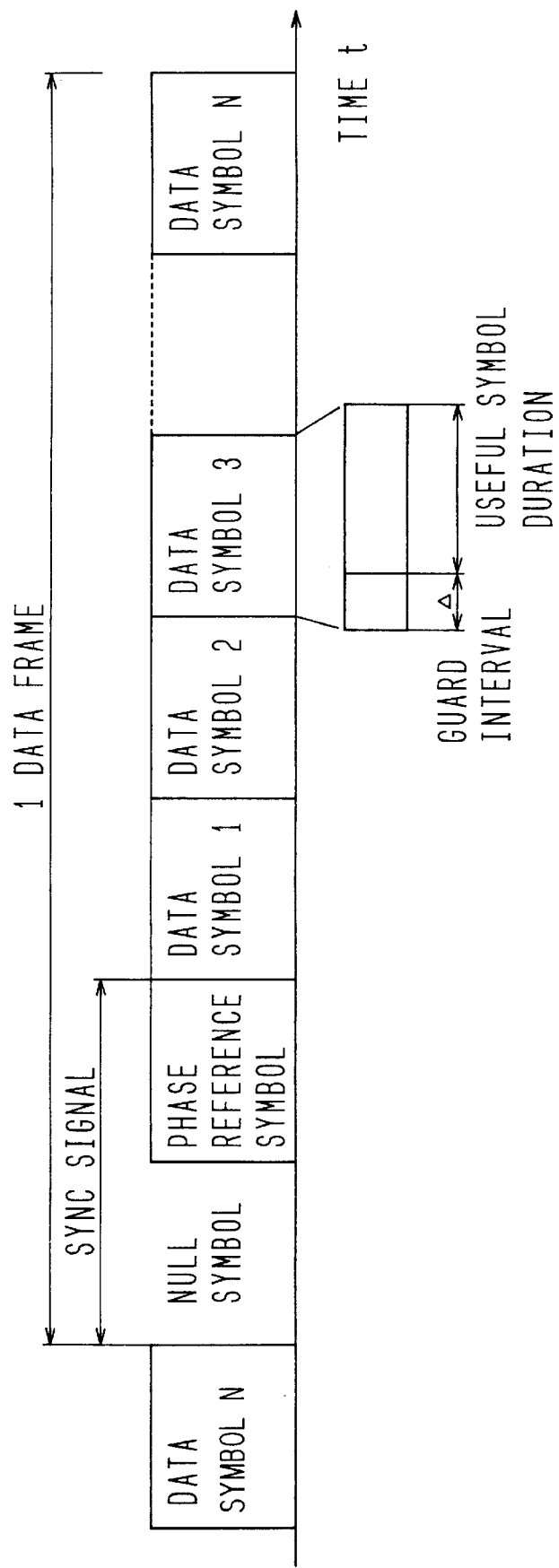
FIG. 16 is a data structure diagram of DAB.

The determination processes in the flow chart of FIG. 5 are performed by the control device 12 shown in FIG. 14. The timing synchronization processing devices in FIG. 1 and FIG. 2 are included in the control device 12 and operations of the individual component blocks, though not shown in diagram, are controlled as part of operation of the control device 12. Actually, the timing synchronization processing device can be implemented as program operation with DSP (Digital Signal Processing processor), for example. In this case, the flow chart of FIG. 5 shows the program operation of the part shown as the timing synchronization processing device performed in the DSP, for example.

In the timing synchronization processes 203 and 210 in FIG. 5, it is possible to replace the equal interval thinning-out by bandwidth limitation. FIG. 7 shows the procedure of processing in which the equal interval thinning-out is eliminated in the timing synchronization processes 203, 210 in FIG. 5. The timing synchronization processing in this case is performed as shown in FIG. 8A to FIG. 8D, where FIG. 8A to FIG. 8D respectively correspond to FIG. 6A to FIG. 6D. (In this case, the range of extraction limited by the bandwidth limitation performed later is set narrower). In this case, the amount of data can be reduced without shortening the effective symbol period.

Third Preferred Embodiment

Figure 9:
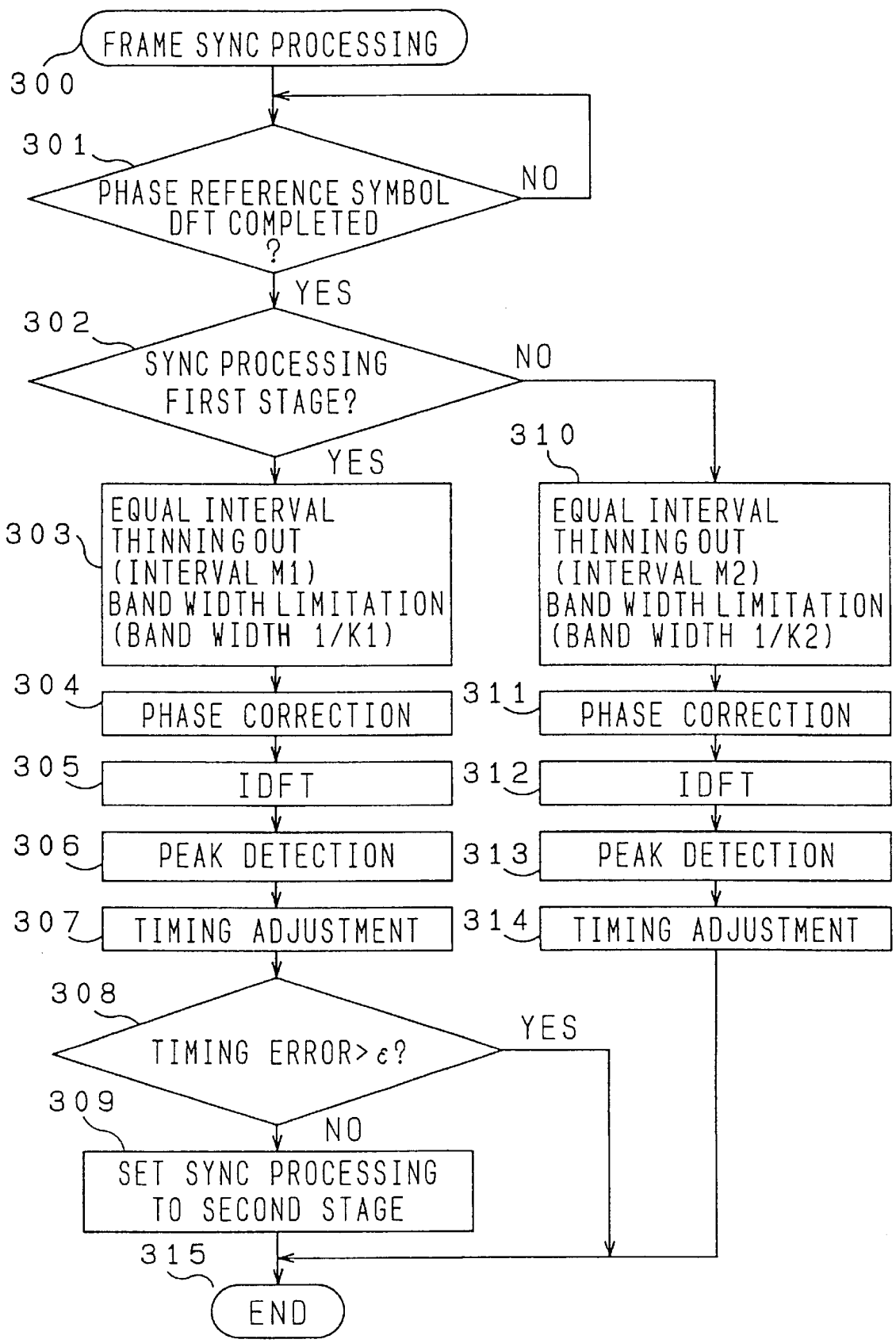
FIG. 9 is a flow chart of a timing synchronization processing according to a third preferred embodiment of the present invention.

The timing synchronization processing device in the third preferred embodiment can be illustrated in the same way as that shown in FIG. 2. FIG. 9 is a flow chart of the timing synchronization processing in the third preferred embodiment of the invention. In this diagram, 301 denotes determination of completion of the DFT processing of the phase reference symbol, 302 denotes determination of the current stage of the synchronization processing, 303 to 307 denote the first stage of timing synchronization processing, and 310 to 314 denote the second stage of timing synchronization processing. The numeral 308 denotes determination of magnitude of the timing shift and 309 denotes a stage changing processing of the timing synchronization processing.

It is assumed that the rough timing synchronization processing based on the envelope detection of the null symbol has been completed at the beginning 300 of the synchronization processing based on the processing of the phase reference symbol data. Next, when the completion of the DFT processing of the phase reference symbol is determined in 301, the current stage of the synchronization processing is determined in 302. As the result, in the case of the first stage, data are thinned out and extracted at relatively close intervals (intervals M1) and in a relatively wide width band in the thinning-out/bandwidth limitation process 303 and then the timing synchronization processes in 304 to 307 are performed. When the result of the processing is checked in 308 and it is revealed that the timing shift is already small enough, it moves to the next stage of the synchronization processing (the second stage); otherwise the processing is continued in that stage.

Next, in the synchronization processes 310 to 314 in the second stage in which the timing shift has been already made small enough, the data are thinned out in the thinning out process/bandwidth limitation process 310 to such a degree (the intervals M2) and with such a bandwidth limitation that the timing shift left in the first stage of synchronization processes 303 to 307 can be sufficiently detected. This way, performing the timing synchronization processing based on the processing of the phase reference symbol data in two stages together with bandwidth limitation enables further reduction of the amount of processed data.

Figure 10A:
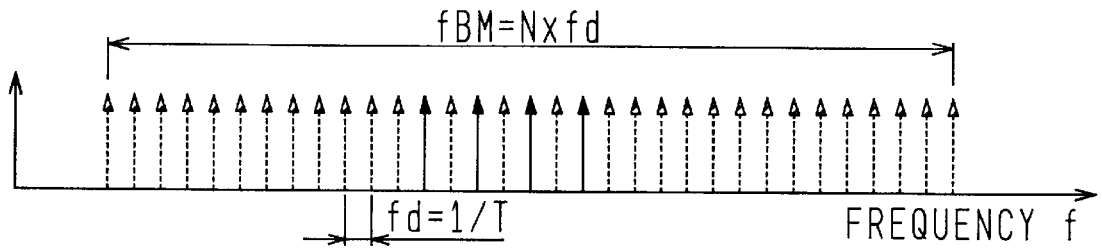
FIGS. 10A, 10B, 10C, and 10D are diagrams illustrating the operation of the timing synchronization processing device according to the third preferred embodiment of the present invention.
Figure 10B:
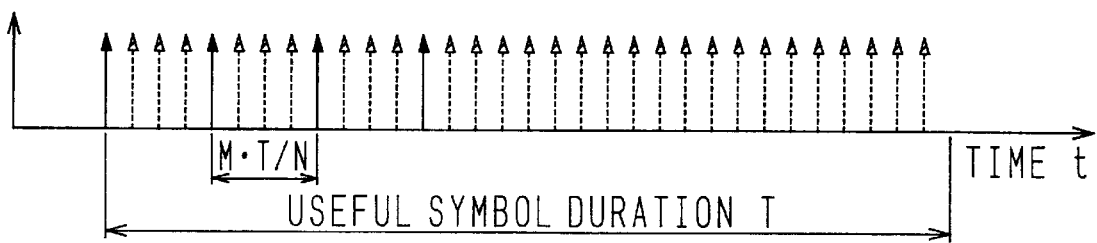
Figure 10C:
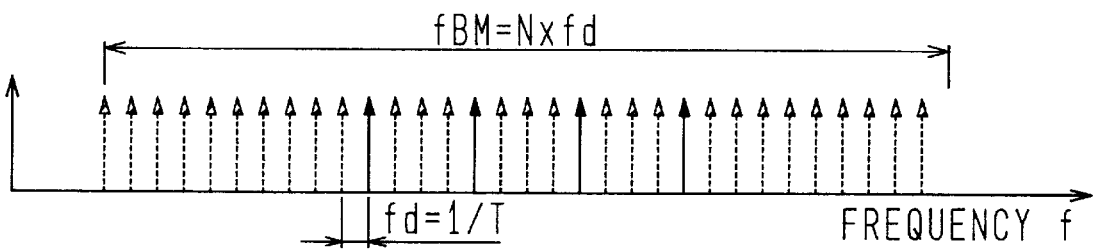
Figure 10D:
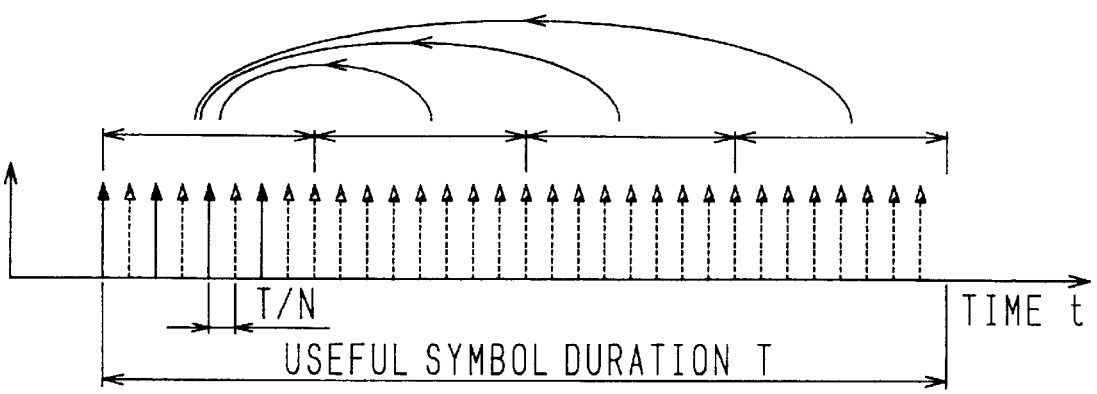

FIG. 10A to FIG. 10D are diagrams for describing the timing synchronization processing according to the third preferred embodiment, where FIG. 10A and FIG. 10B show an example of the first stage of processing and FIG. 10C and FIG. 10D show an example of the second stage of processing.

The determining processes in the flow chart of FIG. 6 are performed by the control device 12 shown in FIG. 14. The timing synchronization processing devices in FIG. 1 and, FIG. 2 are included in the control device 12 and operations of the individual component blocks, though not shown in diagram, are controlled as part of operation of the control device 12. Actually, the timing synchronization processing device can be implemented as program operation with DSP (Digital Signal Processing processor), for example. In this case, the flow chart of FIG. 6 shows the program operation of the part shown as the timing synchronization processing device performed in the DSP, for example.

Although the phase correcting means 101, the phase reference symbol data holding means 102, the IDFT means 103, the peak detecting means 104 and the selective data extraction means 105 have been explained as independent means so far, these, too, can be structured as program processing by using a digital signal processor (DSP), for example.

Figure 11:
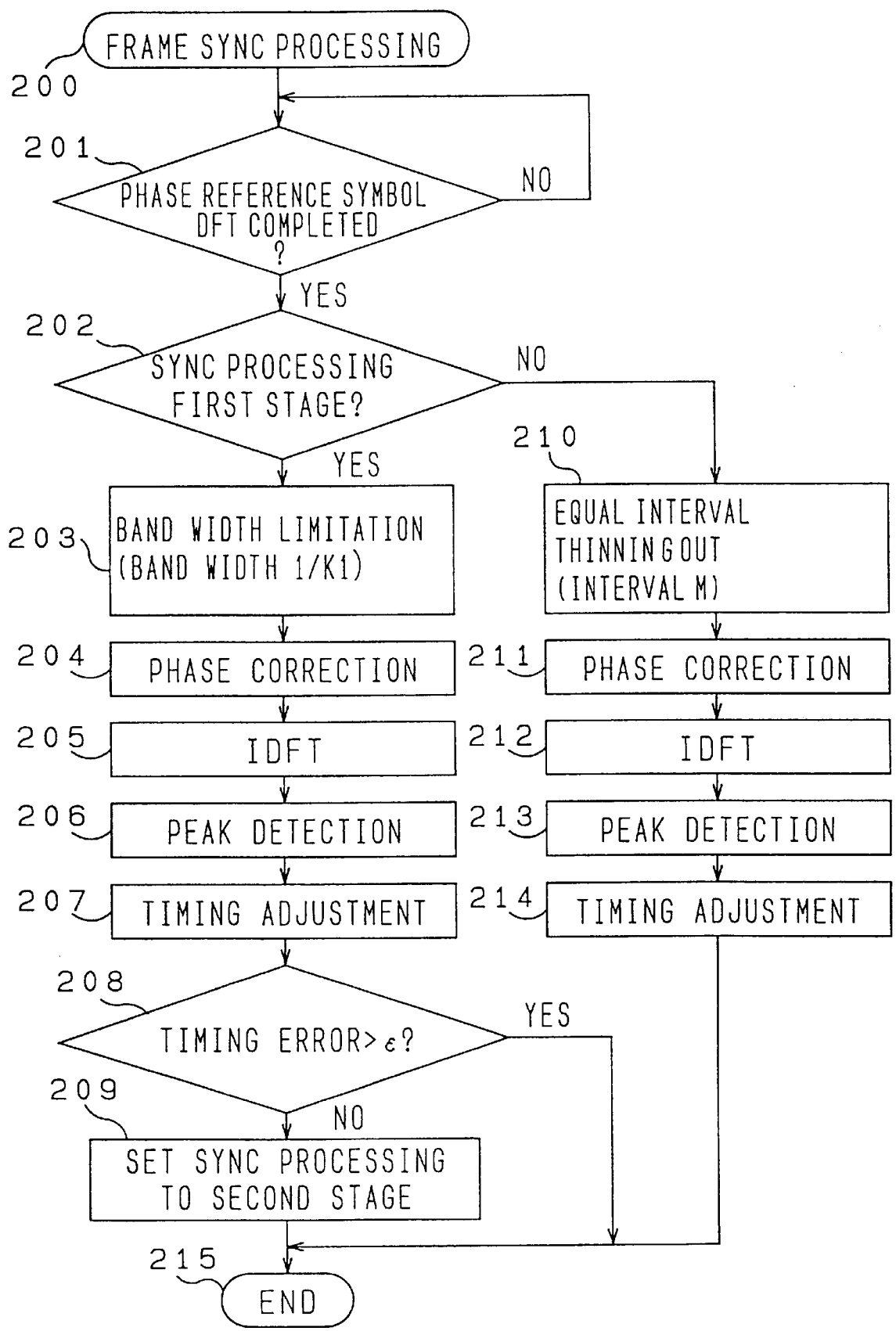
FIG. 11 is a flow chart of a timing synchronization processing of the third preferred embodiment of the present invention.
Figure 12A:
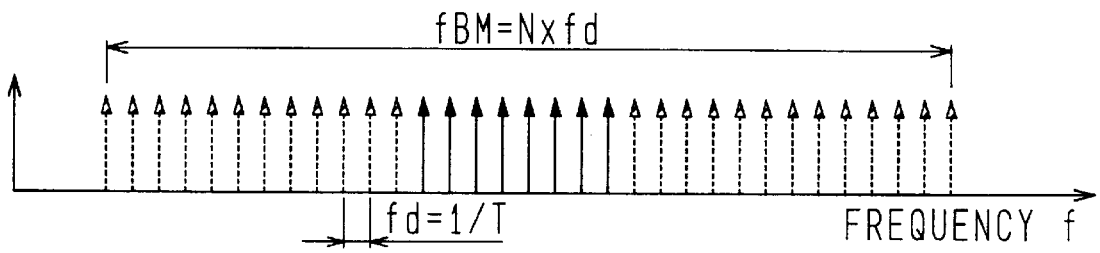
FIGS. 12A, 12B, 12C, and 12D are diagrams illustrating the operation of the timing synchronization processing device according to the third preferred embodiment of the present invention.
Figure 12B:
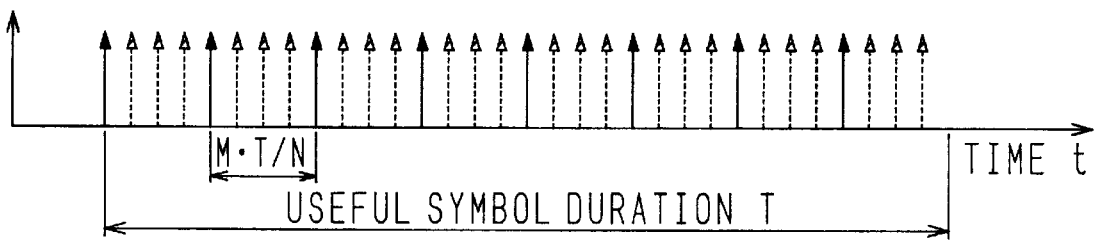
Figure 12C:
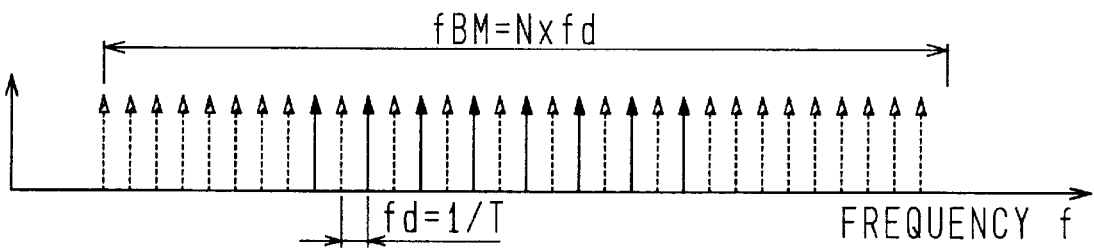
Figure 12D:
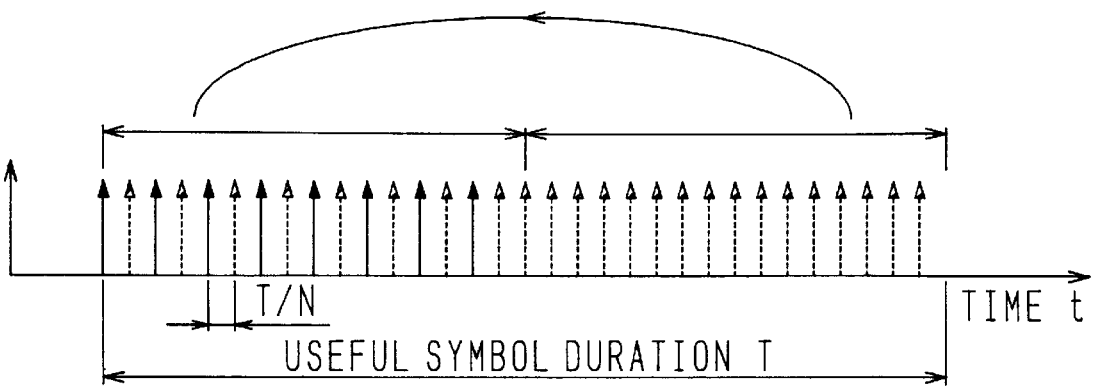

It is possible to eliminate the equal interval thinning out in the timing synchronization process 303 in FIG. 9 and perform only the equal interval thinning-out in the process 310 with the bandwidth limitation removed therefrom. FIG. 11 shows the procedure in this case. The timing synchronization processing in this case is performed as shown in FIG. 12A to FIG. 12D, where FIG. 12A to FIG. 12D respectively correspond to FIG. 10A to FIG. 10D. This provides similar effect to the timing synchronization processing of the third preferred embodiment.

Figure 13:
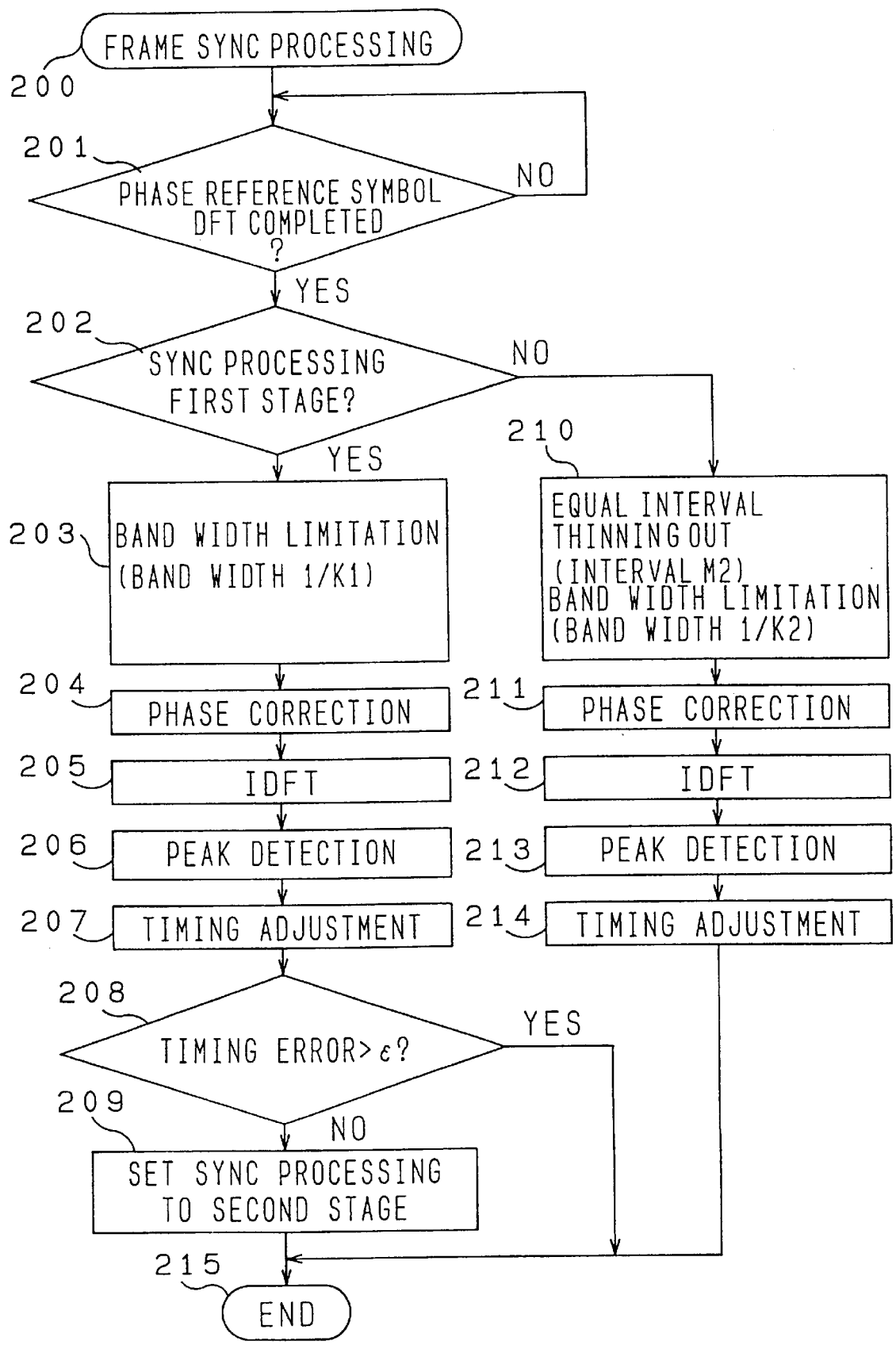
FIG. 13 is a flow chart of a timing synchronization processing of the third preferred embodiment of the present invention.

It is also possible to remove the equal interval thinning-out in the timing synchronization process 303 in FIG. 9, the procedure of which case is shown in FIG. 13. In this case, like the third preferred embodiment, the extracting range limited by the bandwidth limitation performed later is set wider than that in the first stage.

While the invention has been described in detail, the foregoing description is in all aspects illustrative and not restrictive. It is understood that numerous other modifications and variations can be devised without departing from the scope of the invention.

We claim:

1. A digital broadcasting receiver for multi-carrier transmission system, comprising:

a data demodulator for performing demodulation of modulation data on a received signal;

selective data extraction means for extracting data from an arrangement of phase reference symbol demodulation data output from said data demodulator;

phase correcting means for performing multiplication, for each element, of the extracted data by said selective data extraction means and an arrangement of conjugate complex numbers of defined values of the phase reference symbols held in the receiver in advance in correspondence with said extracted data;

inverse discrete Fourier transform means for applying inverse discrete Fourier transform to the output from said phase correcting means;

peak detecting means for obtaining a peak of the result of the inverse discrete Fourier transform in said inverse discrete Fourier transform means; and synchronization control means for performing synchronization by adjusting timing of the received signal provided to said data demodulator on the basis of a position of the peak detected by said peak detecting means, wherein the extracted data are selectively extracted from the phase reference demodulated data in such a way as to reduce the number of reference demodulation data thereby reducing a processing load performed by said phase correction means and said synchronization control means.

2. The digital broadcast receiver according to claim 1, wherein said selective data extraction means extracts data in a skipped manner at approximately equal frequency intervals in the arrangement of the phase reference symbol demodulation data.

3. The digital broadcasting receiver according to claim 1, wherein said selective data extraction means extracts data in a skipped manner in a prescribed frequency range in the center part of the signal transmission band in the arrangement of the phase reference symbol demodulation data.

4. The digital broadcasting receiver according to claim 1, wherein data symbols following said phase reference symbol include a guard interval.

5. The digital broadcasting receiver according to claim 1, wherein said selective data extraction means extracts data in a skipped manner at approximately equal prescribed frequency intervals in the arrangement of the phase reference symbol demodulation data at the beginning of the synchronization, and in the next stage of the synchronization, extracts the data in a skipped manner at rougher intervals than at the beginning of the synchronization.

6. The digital broadcasting receiver according to claim 1, wherein the received signal has a corresponding signal transmission band, and wherein said selective data extracting means extracts data in a prescribed frequency range in the center part of the signal transmission band in the arrangement of the phase reference symbol demodulation data at the beginning of the synchronization, and extracts the data, in the next stage of the synchronization, in a narrower frequency range in the center part of the signal transmission band than at the beginning of the synchronization.

7. The digital broadcasting receiver according to claim 1, wherein the received signal has a corresponding signal transmission band, and wherein said selective data extraction means extracts data in a prescribed frequency range in the center part of the signal transmission band and at approximately equal prescribed intervals in the arrangement of the phase reference symbol demodulation data at the beginning of the synchronization, and extracts the data, in the next stage of the synchronization, in a wider frequency range than at the beginning of the synchronization and at rougher frequency intervals than at the beginning of the synchronization.

8. The digital broadcasting receiver according to claim 1, wherein the received signal has a corresponding signal transmission band, and wherein said selective data extraction means extracts data, at the beginning of the synchronization, in a prescribed frequency range in the center part of the signal transmission band in the arrangement of the phase reference symbol demodulation data and at frequency intervals of the arrangement of the phase reference symbol demodulation data, and in the next stage of the synchronization, cancels the bandwidth limitation at the beginning of the synchronization and extracts the data in a skipped manner at approximately equal prescribed frequency intervals in the arrangement of the phase reference symbol demodulation data.

9. The digital broadcasting receiver according to claim 1, wherein the received signal has a corresponding signal transmission band, and wherein said selective data extraction means extracts data in a prescribed frequency range in the center part of the signal transmission band in the arrangement of the phase reference symbol demodulation data at the beginning of the synchronization, and extracts the data, in the next stage of the synchronization, in a wider frequency range than at the beginning of the synchronization and at the approximately equal prescribed frequency intervals in the arrangement of phase reference symbol demodulation data.

10. The digital broadcasting receiver according to claim 1, said selective data extraction means thinning and/or band-limiting the demodulation data from said demodulator.

11. A digital broadcasting receiver for multi-carrier transmission system, comprising:
a demodulator demodulating a signal having multiple carriers and outputting an arrangement of phase reference symbol demodulation data;
a selective data extractor operatively connected to said demodulator, said selective data extractor extracting data from the phase reference symbol demodulation data;
a phase corrector operatively connected to said selective data extractor;
an inverse discrete Fourier transformer operatively connected to said phase corrector;
a peak detector operatively connected to said inverse discrete Fourier transformer; and
a synchronizer connected to said peak detector, said synchronizer performing synchronization by adjusting timing of the signal provided to said demodulator on the basis of a position of the peak detected by said peak detector,
wherein said selective data extractor are selectively extracted from the phase reference demodulated data in such a way as to reduce the number of reference demodulation data thereby reducing a processing load performed by said phase correction means and said synchronization control means.

12. The digital broadcasting receiver according to claim 11, said selective data extractor thins and/or band-limits the demodulation data from said demodulator.

13. The method according to claim 11, wherein said selective data extractor extracts data in a skipped manner at approximately equal frequency intervals in the arrangement of the phase reference symbol demodulation data.

14. The digital broadcasting receiver according to claim 11, wherein said selective data extractor extracts data in a skipped manner in a prescribed frequency range in the center part of the signal transmission band in the arrangement of the phase reference symbol demodulation data.

15. The digital broadcasting receiver according to claim 11, wherein said selective data extractor extracts data in a skipped manner at approximately equal prescribed frequency intervals in the arrangement of the phase reference symbol demodulation data at the beginning of the synchronization, and in the next stage of the synchronization, extracts the data in a skipped manner at longer intervals than at the beginning of the synchronization.

16. The digital broadcasting receiver according to claim 11, wherein the signal has a corresponding signal transmission band, and wherein said selective data extractor extracts data in a prescribed frequency range in the center part of the signal transmission band in the arrangement of the phase reference symbol demodulation data at the beginning of the synchronization, and extracts the data, in the next stage of the synchronization, in a narrower frequency range in the center part of the signal transmission band than at the beginning of the synchronization.

17. The digital broadcasting receiver according to claim 11, wherein the received signal has a corresponding signal transmission band, and wherein said selective data extractor extracts data in a prescribed frequency range in the center part of the signal transmission band and at approximately equal prescribed intervals in the arrangement of the phase reference symbol demodulation data at the beginning of synchronization, and extracts the data, in the next stage of the synchronization, in a wider frequency range than at the beginning of the synchronization and at rougher frequency intervals than at the beginning of the synchronization.

18. The digital broadcasting receiver according to claim 11, wherein the received signal has a corresponding signal transmission band, and wherein said selective data extractor extracts data, at the beginning of the synchronization, in a prescribed frequency range in the center part of the signal transmission band in the arrangement of the phase reference symbol demodulation data and at frequency intervals of the arrangement of the phase reference symbol demodulation data, and in the next stage of the synchronization, cancels the bandwidth limitation at the beginning of the synchronization and extracts the data in a skipped manner at approximately equal prescribed frequency intervals in the arrangement of the phase reference symbol demodulation data.

19. The digital broadcasting receiver according to claim 11, wherein the received signal has a corresponding signal transmission band, and wherein said selective data extractor extracts data in a prescribed frequency range in the center part of the signal transmission band in the arrangement of the phase reference symbol demodulation data at the beginning of the synchronization, and extracts the data, in the next stage of the synchronization, in a wider frequency range than at the beginning of the synchronization, and at the approximately equal prescribed frequency intervals in the arrangement of phase reference symbol demodulation data.

20. A method of receiving a digital broadcasting signal, comprising the steps of:

demodulating a received signal having multiple carriers to output an arrangement of phase reference symbol demodulation data;

selectively extracting data from an arrangement of the phase reference symbol demodulation data output from said data demodulating step;

phase correcting by performing multiplication, for each element, of the extracted data by said selective data extracting step and an arrangement of conjugate complex numbers of defined values of the phase reference symbols;

applying an inverse discrete Fourier transform to the output from said phase correcting step;

obtaining a peak of the result of the applying step; and performing synchronization by adjusting timing of the received signal on the basis of a position of the peak detected by said peak detecting step, wherein the extracted data are selectively extracted from the phase reference demodulated data in such a way as to reduce the number of reference demodulation data thereby reducing a processing load performed by said phase correcting step and said synchronizing step.

\* \* \* \* \*